United States Patent [19]
Carter et al.

[11] Patent Number: 5,418,945
[45] Date of Patent: May 23, 1995

[54] FILE BASED AND HIGHLY AVAILABLE HYBRID DATABASE

[75] Inventors: Renee N. Carter; Warren F. Higgins, both of Mesa; Richard O. Lee, Gilbert, all of Ariz.

[73] Assignee: Motorola, Inc., Schaumburg, Ill.

[21] Appl. No.: 884,816

[22] Filed: May 18, 1992

[51] Int. Cl.⁶ .................. G06F 17/00; G06F 12/00
[52] U.S. Cl. ............................ 395/600; 395/725; 395/650; 395/575
[58] Field of Search ............ 395/650, 575, 600, 725; 364/DIG. 1

[56] References Cited

U.S. PATENT DOCUMENTS

| | | | |
|---|---|---|---|
| 4,714,992 | 12/1987 | Gladney et al. | 364/200 |
| 4,847,830 | 7/1989 | Momirov | 370/94 |
| 5,060,185 | 10/1991 | Naito et al. | 364/900 |
| 5,136,707 | 8/1992 | Block et al. | 395/600 |
| 5,230,047 | 7/1993 | Frey, Jr. et al. | 395/575 |
| 5,263,158 | 11/1993 | Janis | 395/600 |
| 5,263,165 | 11/1993 | Janis | 395/725 |
| 5,287,459 | 2/1994 | Gniewek | 395/275 |
| 5,297,283 | 3/1994 | Kelly, Jr. et al. | 395/650 |
| 5,313,664 | 5/1994 | Sugiyama et al. | 364/405 |

*Primary Examiner*—Thomas G. Black
*Assistant Examiner*—Jean R. Homere
*Attorney, Agent, or Firm*—Robert D. Atkins

[57] ABSTRACT

A file based and highly available hybrid database using resident databases (16, 17, 18) on data control computer systems (31, 32, 33) which are linked together as part of a computer network (29). Resident databases (16, 17, 18) are selected to store master file groups (19,21,22,23) the information being copied to other resident databases (16, 17, 18). All database transactions are controlled by interacting client (11) and server (12, 13, 14) processes using the computer network (29) to copy a master file group (19, 21, 22, 23) to the client system for use and then restores the master file group (19, 21, 22, 23) to the appropriate master database (16, 17, 18).

9 Claims, 3 Drawing Sheets

FILE BASED AND HIGHLY AVAILABLE HYBRID DATABASE

BACKGROUND OF THE INVENTION

The present invention relates, in general, to file based databases, and more particularly to file based databases which are highly available for both read and write access.

A database for factory automation in a multi-national environment must meet a combination of requirements which are more severe than any previous database application. Such a database must be available whenever a production line is in operation, since these production lines are worldwide this calls for essentially continuous availability. Users of the database are spread throughout the world and must be able to exchange information readily, so the database must be compatible with both local and wide area networks. At the same time the database must provide tightly controlled access to sensitive design and manufacturing information. Many users must access the data simultaneously. The data and relationships between each data item are complex; typically each production line is used for several different process flows and for different design groups, each having a unique sequence which must be followed exactly. Each design group in turn may have a different process flow for each production line. Both production line engineering and design engineering must be able to change the design and manufacturing data whenever required and many of these changes affect the parts built in that production line. A typical large company has 50 design groups, 17 production lines and between 10 and 20 flows per production line. The result is a great many opportunities for error. Error elimination is extremely important since even small errors can result in large quantities of defective or scrapped production. Finally, design and manufacturing data is typically organized into files and groups of files rather than into a record or tuple structure as in commercially available databases.

One method previously used to fulfil some of these requirements was to regularly distribute copies of the master database to each user site and access those copies using a local computer system. This method provides high availability since a site can use alternative computer systems if the primary computer system is unavailable. However, the distribution process itself is unwieldy and expensive. Changes to the master database often take weeks or months to be reflected in a user's local database. Since most of these changes are generated at the local site there is always the risk of changes being lost in the updating process. With a large number of sites and users, data integrity is unmanageable. No mechanism is available to control changes in the remote database copies, nor is there any information available to tell if a particular data item has been changed simultaneously at more than one site.

The distribution related problems can be addressed by using a single central database which is accessed remotely through a computer network. However the single central database depends entirely on the availability of a single computer system and the associated network links. If any component is unavailable then the entire database is unavailable everywhere. Since operation of the production lines depends on availability of this database, lack of access can quickly cause shut down of the entire production line. Continual revisions are made to the database information as part of the manufacturing process, requiring both read and write availability at all times. Consequently, switching to a backup database when the master database is not available is not good enough. The system cannot allow writing to the backup database without endangering the data integrity, since the master database would then not match the backup database. A central database simply cannot give the level of availability required.

Apart from availability, some requirements can be met by commercially available databases such as AURICLE or SQL. Typical databases of this kind are described in the book "An introduction to Database Systems", by C. J. Date, Addison-Wesley Publishing Company, Inc., 1977, which material is incorporated herein by reference. This reference includes a data sublanguage called SEQUEL which describes the functioning of a typical commercially available database. These databases can allow access through a network server which is compatible with local and wide area networks. They can allow concurrent transactions with multiple users. Concurrent transactions can be performed on different data as well as the same data within the database. Finally the database can be restored to its original form if a transaction does not complete successfully.

Yet other requirements are met by a version control system such as described in an article entitled "RCS—A System for Version Control", by W. Tichy, published in electronic form and available through the Usenet computer network node "prep.ai.mit.edu", in the directory "/pub/gnu", which article is incorporated herein by reference. Version control systems such as RCS perform transactions on files rather than tuples or records. They can maintain incremental copies of the data, that is a trail of previous versions of the data and the changes from version to version. This capability allows a user to retrieve any earlier version of the data, even if different locations develop different versions. Typically the relationships between versions is very complex, allowing branches and parallel versions. The groups of files can be stored in a hierarchical directory structure, facilitating management of the files.

There exists a need for a hybrid database which combines the features of commercial databases and source code control systems. The hybrid database must ensure validity and integrity of the files in the database, and yet must be always available for both reading and writing. The hybrid database must be compatible with computer networks, yet must provide a high degree of security for sensitive manufacturing information.

DETAILED DESCRIPTION OF THE DRAWINGS

Figure 1:
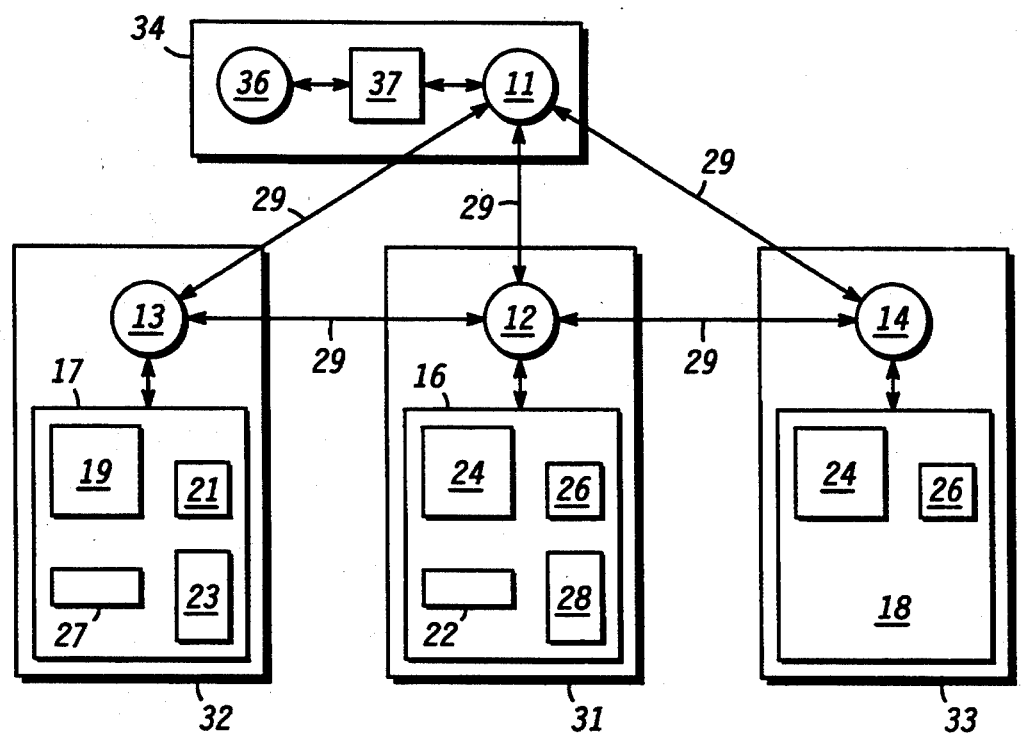
FIG. 1 shows a system diagram of a file based and highly available hybrid database.

FIG. 1 shows a system diagram of a file based and highly available hybrid database as a preferred embodiment in accordance with the present invention. FIG. 1 uses a convention in which data storage is represented by a rectangular shape, a software process is represented by a circle, and data exchanges are represented by an arrow in the direction of data exchange. A line having two arrowheads represents a bidirectional data exchange. For brevity and clarity only a single client computer system and three data control computer systems are shown, although a typical embodiment of the hybrid database would include many more computer systems and databases. Examples of computer systems which are suited for use with the preferred embodiment in accordance with the present invention are UNIX based systems such as the Apollo Domain, or SUN systems. A suitable network is the Ethernet network, using SMTP or a similar network protocol.

A first data control computer system 31, a second data control computer system 32 and a third data control computer system 33 store a first resident database 16, a second resident database 17 and a third resident database 18 respectively. First data control computer system 31, second data control computer system 32 and third data control computer system 33 are linked together as part of a computer network 29. Computer network 29 serves to allow processes on any of the data control computer systems which are part of computer network 29 to communicate and to exchange data. First data control computer system 31, second data control computer system 32 and third data control computer system 33 have a server 12, a server 13, and a server 14 respectively.

Server 12 is an autonomous server process running on first data control computer system 31. Server 12 performs any required transactions with first resident database 16. Server 13 and server 14 perform the same functions as server 12, but operate on second data control computer system 32 with second resident database 17, and third data control computer system 33 with third resident database 18 respectively.

First resident database 16, second resident database 17 and third resident database 18 comprise an hierarchical file structure in which groups of files are stored underneath a common root directory. The groups of files themselves form a similar hierarchy of directories and files within a common file group directory. The database information is thus a plurality of sub-directories within a master database directory, each sub-directory containing a predetermined group of files and sub-directories. The individual files contain the information required for a predetermined design to be fabricated with a predetermined process flow on a predetermined fabrication line. First resident database 16 contains a first master file group 22. First master file group 22 is a predetermined, hierarchical grouping of files stored within first resident database 16, making first resident database 16 the master resident database for first master file group 22. Second resident database 17 contains a first group copy 27, a second master file group 21, a third master file group 19, and a fourth master file group 23. Second master file group 21 and fourth master file group 23 are similar groupings of files stored within second resident database 17. In addition to first master file group 22, first resident database 16 contains a third file group copy 24, a second file group copy 26, and a fourth file group copy 28. Third file group copy 24 is a copy of third master file group 19. Likewise second file group copy 26, first group copy 27 in second resident database 17, and fourth file group copy 28 are copies of second master file group 21, first master file group 22 and fourth master file group 23 respectively. Third resident database 18 contains no master file groups, but contains third file group copy 24 and second file group copy 26.

Figure 3:
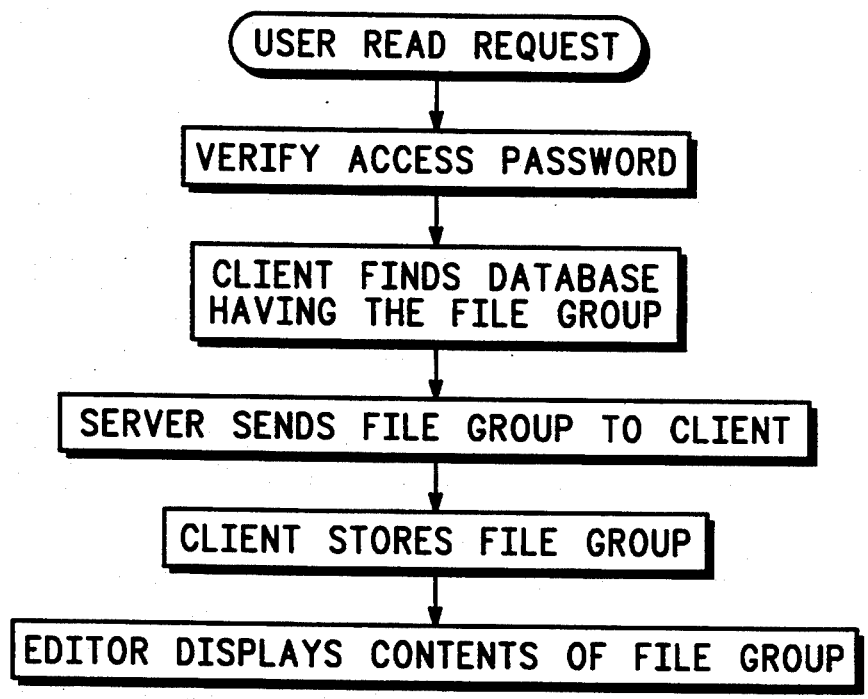
FIG. 3 is a flow chart which outlines the steps for reading a file group from the hybrid database.

A client computer system 34 is linked to first data control computer system 31, second data control computer system 32 and third data control computer system 33 as part of computer network 29. A client 11 is an autonomous process running on client computer system 34. Client computer system 34 also contains a file group copy 37, and an editor 36. A user (not shown) first requests access to third master file group 19 by entering that request into client computer system 34. This causes client 11 to send a request for either third master file group 19 or third file group copy 24 to a predetermined server, such as server 12. If for some reason server 12 was unavailable or unable to satisfy the request, for example if first resident database 16 did not contain third file group copy 24, then server 13 and server 14 would be tried. Client 11 tries alternate servers according to a predetermined ordering. Once either third master file group 19 or third file group copy 24 is found, a tracking procedure is performed as described below (FIG. 3). A new copy is made which is sent to client 11 and stored on client computer system 34 as file group copy 37. Editor 36 is an autonomous process running on client computer system 34 which allows inspection of files within file group copy 37. Editor 36 also makes desired changes to file group copy 37. Editor 36 can perform file handling functions such as creating new files, deleting files, and renaming files. Typically editor 36 is one of the commercially available text editor programs, combined with other file handling software which is found in typical computer system file utility software.

Figure 2:
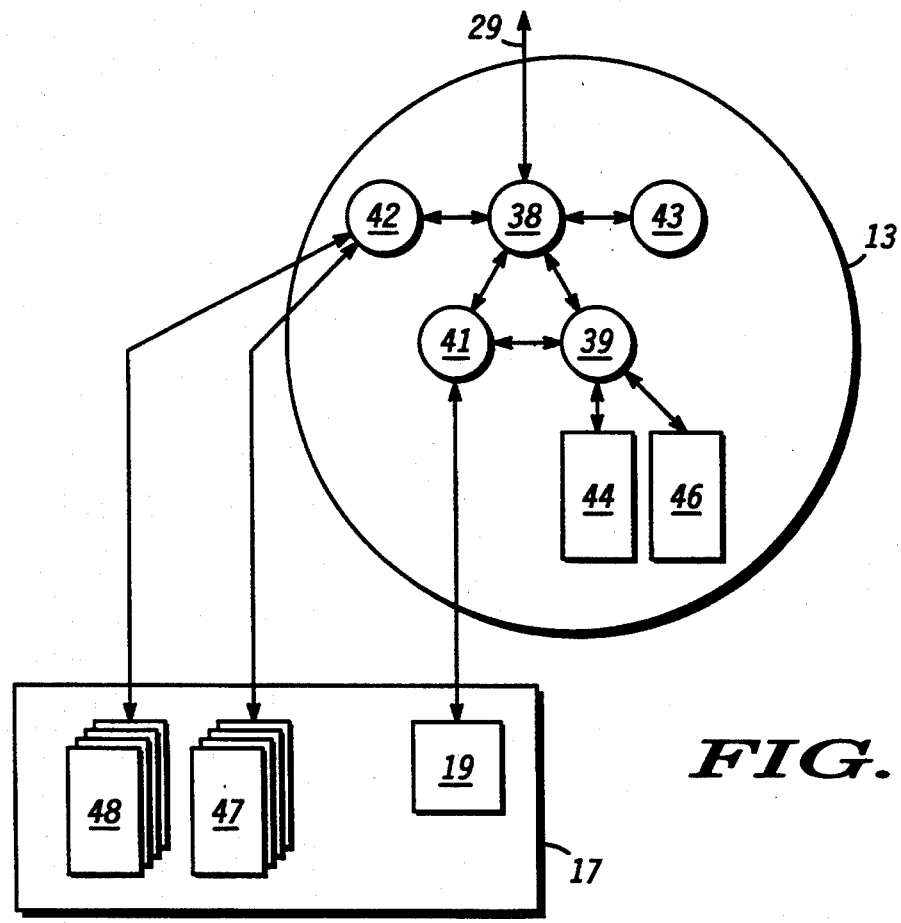
FIG. 2 shows a system diagram of a server which is part of the file based and highly available hybrid database of FIG. 1.

FIG. 2 shows a system diagram of server 13 which is part of the file based and highly available hybrid database of FIG. 1. Server 13 comprises a variety of separable functions: Server means 38 for interacting with clients and other servers through computer network 29. Storing means 41 for fetching file groups from second resident database 17 and for writing new or changed master file groups to second resident database 17. Security means 39 for authorizing or denying access to second resident database 17. State means 43 for coordinating the read and write state of the master file groups. Tracking means 42 for tracking and verifying the relationships between file groups, including version control. Server means 38 provides the sole access to second resident database 17, and is designed to respond only to requests from client 11, server 12, or server 14. Once a transaction request is received from client 11, server 12, or server 14, the request is first validated by security means 39. Security means 39 maintains an access password 44 and a write password list 46. Security means 39 allows access through server means 38 only if the transaction request provides access password 44. Tracking means 42 maintains a plurality of design templates 47 and a plurality of fabrication templates 48. Tracking means 42 locates the appropriate design template 47 and the appropriate fabrication template 48 for file group 19. Third master file group 19 comprises design data and manufacturing data in the form of the appropriate design template 47 and the appropriate fabrication template 48, together with parts data which is derived from the appropriate design template 47 and the appropriate fabrication template 48.

FIG. 3 is a flow chart which outlines the steps for reading a file group from the hybrid database. When a copy of third master file group 19 (FIG. 1) is requested and the request validated by security means 38 (FIG. 2), Tracking means 42 (FIG. 2) then checks third master file group 19 (FIG. 1) by verifying that the specified design, fabrication line, and process flow have not been modified since master file group 19 was last modified. Tracking means 42 performs other validity checks, for example a check is performed to ensure that files within third master file group 19 (FIG. 1) are consistent with the most recent version of the template from which they were derived. Storing means 41 (FIG. 2) then provides the copy to server means 38. Server means 38 then forwards the copy of third master file group 19 to client 11 and stored on client computer system 34 as file group copy 37 (FIG. 1).

Figure 4:
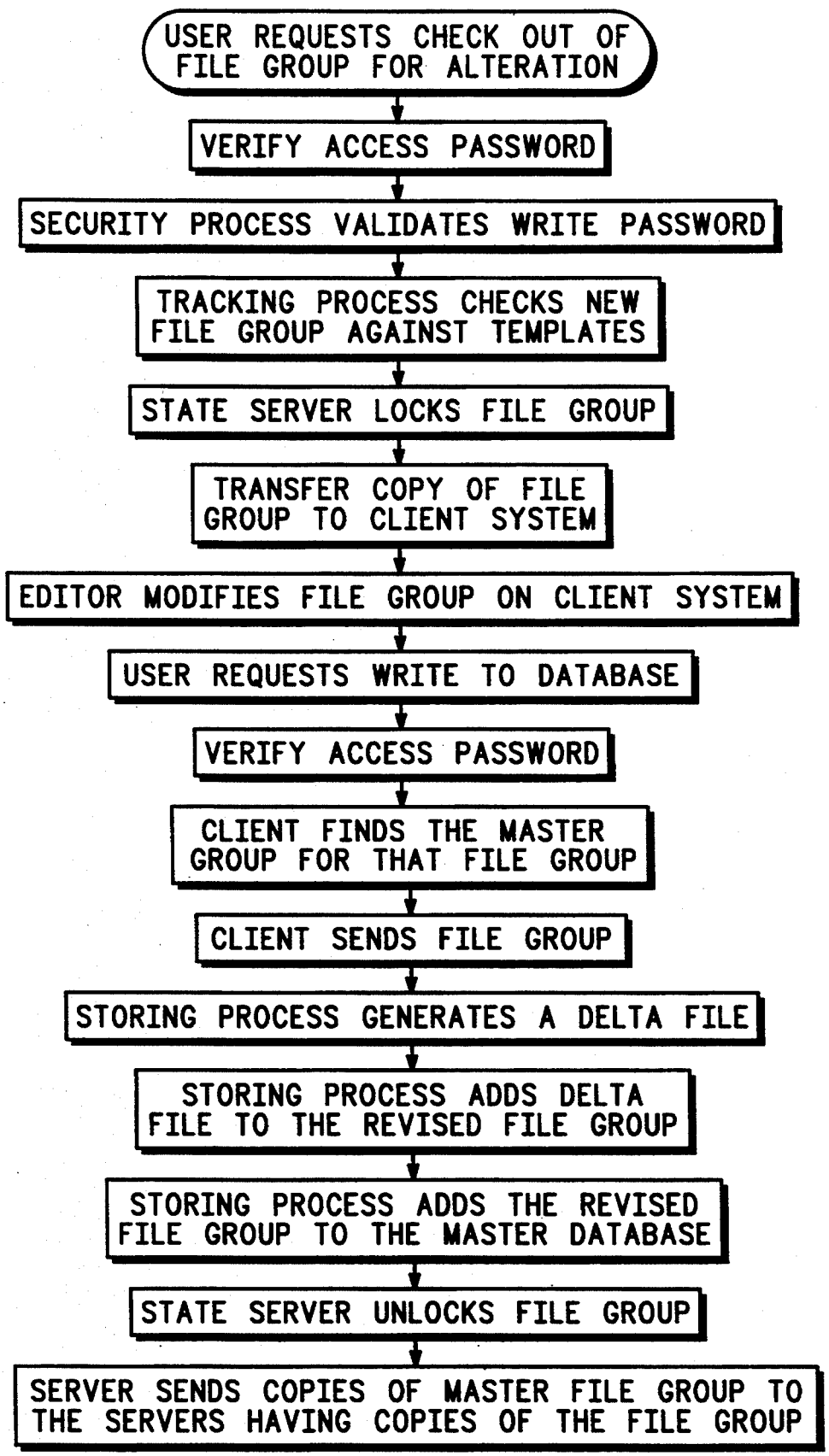
FIG. 4 is a flow chart which outlines the steps for writing a file group to the hybrid database.

FIG. 4 is a flow chart which outlines the steps for writing a file group to the hybrid database. Third master file group 19 (FIG. 2) is checked out for alteration, so state means 43 (FIG. 2) records third master file group 19 as being locked. State means 43 ensures that only one client has a copy of third master file group 19 checked out for alteration, were third master file group 19 already in a locked state then the check out request would be denied. Controlled override means allow a selective check in and rewriting of third master file group 19 even if third master file group 19 was not previously checked out for alteration. For example if third master file group 19 was not available for check out when requested, client 11 can fetch a copy of third master file group 19 from another database with read permission. An authorized user then causes controlled override means to replace third master file group 19 with the revised third master file group 19. Use of controlled override means is restricted to a single authorized user.

When changes have been made to file group copy 37 (FIG. 1) which the user wishes to save, a request is generated by client 11. Client 11 (FIG. 1) locates the database which contains third master file group 19, the master file group from which file group copy 37 was derived. Client 11 (FIG. 1) then sends a write request and a copy of file group copy 37 (FIG. 1) to server means 38 (FIG. 2). Should server means 38 be unavailable for some reason, the user can optionally instruct client 11 (FIG. 1) to save file group copy 37 and to retry the request when server means 38 becomes available. Server means 38 first validates the access password using security means 39 as described above. Security means 39 then validates the write permission using write password list 46.

Storing means 41 (FIG. 2) next checks file group copy 37 to ensure that all required files are present and that no extraneous files have been added. Should a required file be missing, storing means 41 uses the previous version of the file. Storing means 41 then compares the contents of existing third master file group 19 with the contents of file group copy 37 and generates a delta file. The delta file contains the editing instructions required to produce the current third master file group 19 from the changed file group copy 37. Storing means 41 then adds the delta file to the changed file group copy 37 and replaces the current third master file group 19 with the changed file group copy 37. State means 43 then unlocks third master file group 19 permitting check outs for further changes. Finally, server means 38 sends copies of the new third master file group 19 to server 12 and server 14 (FIG. 1) to replace the now obsolete copies of third master file group 19.

Figure 5:
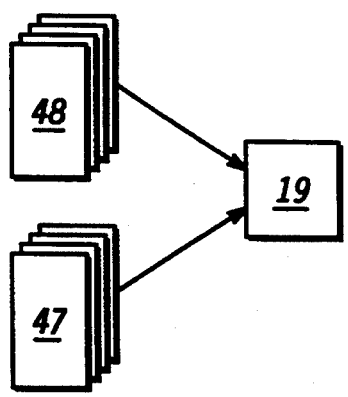
FIG. 5 is a schematic drawing which shows the relationship between the templates and file groups.

FIG. 5 is a schematic drawing showing the relationship between design template 47, fabrication template 48, and third master file group 19. Design template 47 comprises a list of fabrication lines and associated process flows which are valid for a predetermined design. Fabrication template 48 comprises a list of process flows for a fabrication line. Third master file group 19 is created in accordance with both a predetermined design template 47, and a predetermined fabrication template 48. In addition to the functions described above, tracking means 42 continuously tracks the design template 47, and fabrication template 48 from which master group 19 was created. If either design template 47 or fabrication template 48 are altered then the user is informed when a copy of third master file group 19 is accessed. This indicates that design template 47 or fabrication template 48 may contain information which is not reflected in third master file group 19. Third master file group 19 must then be checked and possibly modified to agree with the latest revisions of design template 47 and fabrication template 48.

The present invention provides a hybrid database which combines the desirable multiple concurrent access and network server compatibility of commercial databases with the file oriented data structure and sophisticated version control of source code control systems. The hybrid database ensures validity and integrity of the files in the database. The file information is always available to users both for reading and for writing. The hybrid database is compatible with both local and wide area computer networks, and provides a high degree of security for file access.

We claim:

1. A method of accessing file-based databases that are linked together across a computer network, comprising the steps of:

storing a first master file group on a first one of the databases where said first master file group is edited by down-loading said first master file group to a first remote user having checkout authorization and then replacing said first master file group on said first one of the databases with a first edited version created by said first remote user having checkout authorization;

storing a copy of said first master file group on other ones of the databases where said copy of said first master file group is down-loaded to a second remote user;

replacing said copy of said first master file group on other ones of the databases with said first edited version created by said first remote user having checkout authorization upon updating said first master file group on said first one of the databases;

allowing said second remote user with exclusive override authorization to locally edit said copy of said first master file group and replace said first master file group on said first one of the databases with a second edited version created by said second remote user having exclusive override authorization;

replacing said copy of said first master file group on other ones of the databases with said second edited version created by said second remote user having exclusive override authorization upon updating said first master file group on said first one of the databases;

storing a second master file group on a second one of the databases where said second master file group is edited by down-loading said second master file group to a third remote user having checkout authorization and then replacing said second master file group on said second one of the databases with a third edited version created by said third remote user having checkout authorization; and storing a copy of said second master file group on other ones of the databases where said copy of said second master file group is down-loaded to a fourth remote user.

2. The method of claim 1 further comprising the step of allowing said fourth remote user with exclusive override authorization to locally edit said copy of said second master file group and replace said second master file group on said second one of the databases with a fourth edited version created by said fourth remote user having exclusive override authorization.

3. The method of claim 2 further comprising the step of replacing said copy of said second master file group on other ones of the databases with said fourth edited version created by said fourth remote user having exclusive override authorization upon updating said second master file group on said second one of the databases.

4. The method of claim 3 further comprising the step of establishing exclusive override authorization over said first master file group with said second remote user as owner of said first master file group.

5. The method of claim 4 further comprising the step of granting said checkout authorization over said first master file group to said first remote user by said second remote user.

6. The method of claim 5 further comprising the step of establishing exclusive override and checkout authorization over said second master file group with said third remote user as owner of said second master file group.

7. The method of claim 6 further comprising the step of granting said exclusive override and checkout authorization over said second master file group to said fourth remote user by said third remote user.

8. The method of claim 7 further comprising the step of tracking updates of said first and second edited versions to coordinate changes between said first master file group and said copy of said first master file group to ensure that said copy of said first master file group is consistent with said first master file group.

9. The method of claim 8 further comprising the step of tracking updates of said third and fourth edited versions to coordinate changes between said second master file group and said copy of said second master file group to ensure that said copy of said second master file group is consistent with said second master file group.

* * * * *